(12) United States Patent
Scrafford et al.

(10) Patent No.: US 7,996,729 B2
(45) Date of Patent: Aug. 9, 2011

(54) METHOD AND SYSTEM FOR MAINTENANCE OF NETWORK RENDERING DEVICES

(75) Inventors: Matthew Scrafford, Fairport, NY (US); Jeremy Lee Reitz, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 44 days.

(21) Appl. No.: 12/570,889

(22) Filed: Sep. 30, 2009

(65) Prior Publication Data

US 2011/0078514 A1 Mar. 31, 2011

(51) Int. Cl.
*G06F 11/00* (2006.01)
(52) U.S. Cl. .................. 714/47.2; 379/9.02; 379/9.03
(58) Field of Classification Search ............ 714/47; 379/9.02, 9.03, 9.04; 399/8, 9, 10
See application file for complete search history.

(56) References Cited

U.S. PATENT DOCUMENTS

| | | | | |
|---|---|---|---|---|
| 5,620,264 A * | 4/1997 | Kagita | | 400/74 |
| 5,790,916 A * | 8/1998 | Sawada | | 399/21 |
| 5,920,405 A | 7/1999 | McIntyre et al. | | 358/442 |
| 6,006,016 A * | 12/1999 | Faigon et al. | | 714/48 |
| 6,445,774 B1 * | 9/2002 | Kidder et al. | | 379/9.03 |
| 6,587,647 B1 * | 7/2003 | Watanabe et al. | | 399/8 |
| 6,604,212 B2 * | 8/2003 | Sekizawa | | 714/47 |
| 7,131,032 B2 * | 10/2006 | Gibson et al. | | 714/26 |
| 7,200,613 B2 | 4/2007 | Schlonski et al. | | 707/104.1 |
| 7,266,734 B2 * | 9/2007 | Chavez et al. | | 714/48 |
| 7,336,383 B2 | 2/2008 | Kageyama | | 358/1.15 |
| 7,343,105 B2 * | 3/2008 | Sasaki | | 399/8 |
| 7,355,758 B2 * | 4/2008 | Desai | | 358/400 |
| 7,382,474 B2 | 6/2008 | Motosugi et al. | | 358/1.14 |
| 7,568,133 B1 * | 7/2009 | Bette et al. | | 714/48 |
| 7,653,839 B2 * | 1/2010 | Takahashi | | 714/47 |
| 7,653,841 B2 * | 1/2010 | Yokokura | | 714/48 |
| 7,818,631 B1 * | 10/2010 | Halikhedkar et al. | | 714/48 |
| 7,929,668 B2 * | 4/2011 | Boetje et al. | | 379/9.03 |
| 2002/0087680 A1 * | 7/2002 | Cerami et al. | | 709/224 |
| 2003/0093521 A1 | 5/2003 | Schlonski et al. | | 709/224 |
| 2003/0226059 A1 * | 12/2003 | Braun | | 714/20 |
| 2005/0081118 A1 * | 4/2005 | Cheston et al. | | 714/47 |
| 2006/0064481 A1 * | 3/2006 | Baron et al. | | 709/224 |
| 2007/0150812 A1 | 6/2007 | Hu | | 715/705 |
| 2008/0104453 A1 * | 5/2008 | Mukherjee et al. | | 714/47 |

(Continued)

OTHER PUBLICATIONS

Xerox Device Manager, www.consulting.xerox.com/device-management/enus.html, 2009.

(Continued)

*Primary Examiner* — Marc Duncan
(74) *Attorney, Agent, or Firm* — Kermit D. Lopez; Luis M. Ortiz; Kevin Soules

(57) ABSTRACT

A method and system for automatically generating a helpdesk ticket when a remote rendering device possesses a series of customer resolvable events within a time period. The helpdesk ticket can be moved into an active state when an alert associated with the customer resolvable events is triggered and the ticket can be moved into a passive state when the alert is no longer triggered for the predefined time period. The helpdesk ticket can be retained in the active state if the fault condition detected for a defined number of times without being out of that state for the predefined time period. A device management module sends a notification indicative on each change of the state associated with the rendering device to a helpdesk unit. The device management module can also reset the time period between alerts if the problem occurs infrequently and the ticket can be automatically closed.

18 Claims, 5 Drawing Sheets

U.S. PATENT DOCUMENTS

| | | | |
|---|---|---|---|
| 2008/0246986 A1 | 10/2008 | Serafford et al. | 358/1.15 |
| 2008/0246987 A1 | 10/2008 | Scrafford et al. | 358/1.15 |
| 2008/0247767 A1 | 10/2008 | Scrafford et al. | 399/8 |
| 2009/0100371 A1 | 4/2009 | Hu | 715/780 |
| 2010/0211817 A1* | 8/2010 | Yang et al. | 714/4 |

OTHER PUBLICATIONS

Xerox Document Links Services Platform, Technical Brief-Xerox Global Services, www.xerox.com/globalservices, 2008.

* cited by examiner

METHOD AND SYSTEM FOR MAINTENANCE OF NETWORK RENDERING DEVICES

TECHNICAL FIELD

Embodiments are generally related to rendering devices, such as printers, scanners, multi-function devices, photocopy machines, and the like. Embodiments also relate in general to the field of computers and similar technologies, and in particular to software utilized in this field.

BACKGROUND OF THE INVENTION

Network printing systems are capable of interacting with an assemblage of varying rendering devices, client computers, servers, and other components that are connected to and communicate over a network. Rendering devices include components such as printers, scanners, faxes, copy machines, and so forth. Preventative maintenance can be performed with respect to such rendering devices to ensure that the device continues to function well with quality output and to protect the device from possible breakdowns while extending the lifetime of the device.

Typically, preventative maintenance is ensured by employing a technician off site in order to manage and maintain the rendering devices. Problems (e.g., paper jams) associated with such rendering devices, may be resolved by a customer without having to actually contact a technician to service the rendering device. These types of customer resolvable issues are often not tracked as problems requiring a technician to be dispatched on-site, as they are assumed to represent normal operations, fully curable by the customer. In some cases, however, when the rendering device encounters a recurring issue, it can be assumed that such problems are due to a machine malfunction and that service should be dispatched. Organization "helpdesks" typically are not aware of such issues until members of the organization and/or other users, such as employees and customers, report the problem(s).

Based on the foregoing it is believed that a need exists for an improved method and system for automatically generating a helpdesk ticket when a remote rendering device possesses a series of customer resolvable issues within a period of time. A need also exists for effectively managing the helpdesk ticket associated with the rendering device, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the embodiments to provide for an improved method and system for managing rendering devices, such as printers, scanners, multi-function devices, photocopy machines, and the like.

It is another aspect of the embodiments to provide for an improved method and system for automatically generating a helpdesk ticket when a remote rendering device possesses a series of customer resolvable issues within a period of time.

It is a further aspect of the embodiments to provide for an improved device management system and method for effectively managing the helpdesk ticket associated with the rendering device.

The aforementioned aspects and other objectives and advantages can now be achieved as described herein. A method and system is disclosed for automatically generating a helpdesk ticket when a remote rendering device possesses a series of customer resolvable events within a time period. Customer resolvable events associated with the rendering device can be monitored and a helpdesk ticket can be initiated when one of the events persists for a predefined time period. The helpdesk ticket can be moved to an active state when an alert associated with the customer resolvable events is triggered and the ticket can be moved to a passive state when the alert is no longer triggered for the predefined time period. The helpdesk ticket can be retained in the active state if the fault condition detected is for a defined number of times without being out of that state for the predefined time period.

A device management module can send a notification indicative of each change of state associated with the rendering device to a helpdesk unit. The device management module can also reset the time period between alerts if the problem occurs infrequently and the ticket may then be automatically closed. The device management module can track previous error states and reset a timer if the same error condition is detected within a specified time period. Each time the helpdesk unit receives an update from the device management module, the helpdesk can update the state of the ticket.

Such an approach proactively manages the rendering device by identifying more serious conditions based on the frequency of occurrence. The centralized helpdesk unit does not lose any information from the rendering device as the incident can be updated each time the rendering device changes state. The occurrence of a fault can be treated to assure continued operation of the rendering device with minimum disruption. Notification of such fault occurrences can guide maintenance activity to ensure uninterrupted device operation. Such a method and system effectively enhances the performance of a rendering device and extends its life expectancy.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed method and system automatically generates a helpdesk ticket when a remote rendering device generates a series of customer resolvable events within a period of time. The system proactively manages the rendering device by identifying more serious conditions based on the frequency of occurrence, which is discussed in greater detail herein. Various computing environments may incorporate capabilities for supporting users accessing networks on which the rendering device(s) reside. The following discussion is intended to provide a brief, general description of suitable computing environments in which the method and system may be implemented. Although not required, the method and system will be described in the general context of computer-executable instructions, such as program modules, being executed by a single computer.

Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

Figure 1:
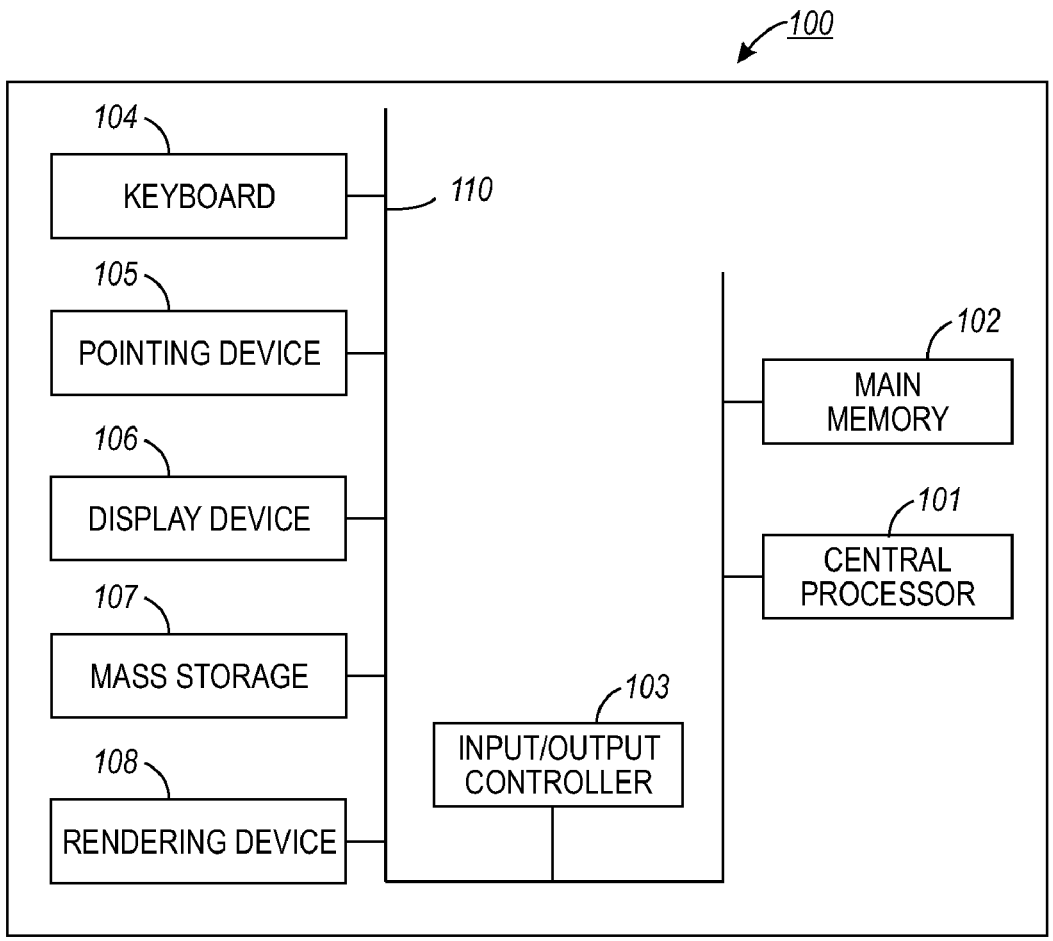
FIG. 1 illustrates a schematic view of a data-processing system in which the present invention may be embodied.
Figure 2:
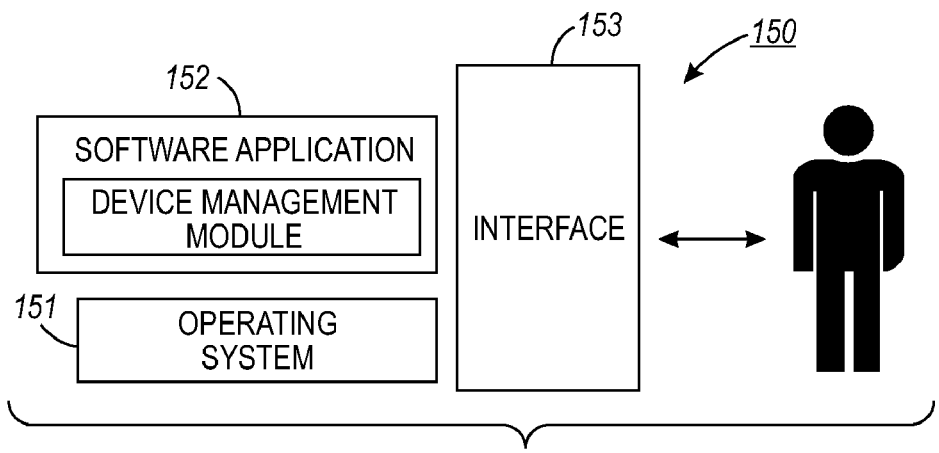
FIG. 2 illustrates a schematic view of a software system including an operating system, application software, and a user interface for carrying out an embodiment.
Figure 3:
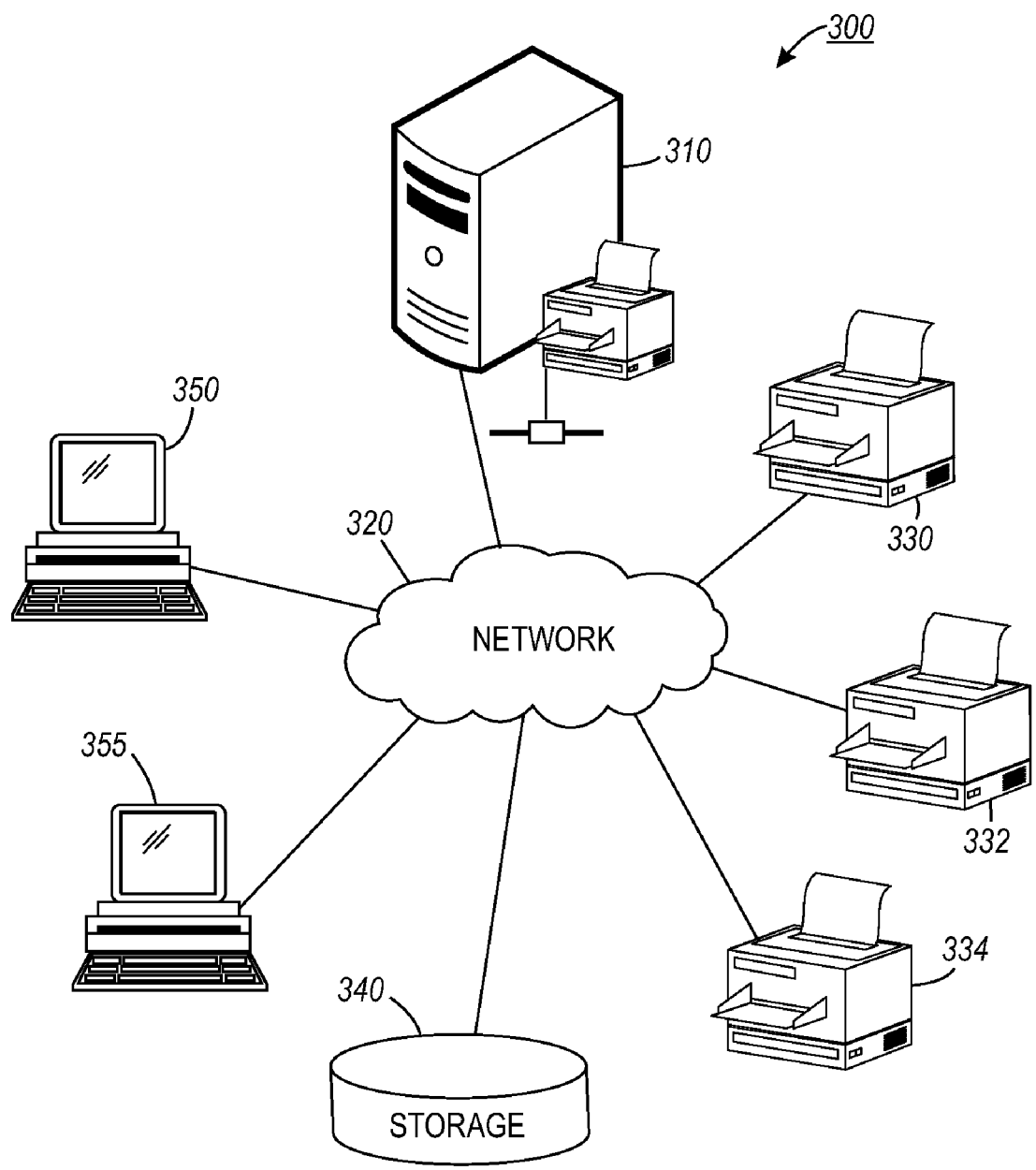
FIG. 3 illustrates a block diagram of a network rendering system, which can be implemented in accordance with an embodiment.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. Note that the rendering device 108 may constitute, for example, a printer, a copier, fax machine, scanner, and/or other types of rendering components, depending upon design considerations. As illustrated, the various components of the data-processing apparatus 100 communicate through a system bus 110 or similar architecture. It can be appreciated that the data-processing apparatus 100 may be in some embodiments, a mobile computing device such as a Smartphone, a laptop computer, iPhone, etc. In other embodiments, data-processing apparatus 100 may function as a desktop computer, server, and the like, depending upon design considerations.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems, such as, Linux may also be employed with respect to operating system 151 and interface 153. Module 152 can be adapted for automatically generating the helpdesk ticket when the remote rendering device 108 possesses a series of customer resolvable issues. Module 152 can be adapted for effectively managing the helpdesk ticket associated with the rendering device 108. Application module 152, on the other hand, can include instructions, such as the various operations described herein with respect to the various components and modules described herein, such as, for example, the method 400 depicted in FIG. 4.

Note that the term "helpdesk" as utilized herein generally refers to a dedicated internal organizational resource that provides technical or functional application problem-solving advice and follow up to system and/or product and/or product users. In this sense, a helpdesk refers to technical support staff that assists in solving users' problems with hardware or software systems or refers such problems to those who can solve them. A "helpdesk" can also refer to so-called helpdesk type software, which can be uniquely modified to periodically contact product or service users, gather, record, and route problems immediately to designate problem solvers, register their commitment to a solution date, confirm their solution on that date, and then verify solution with the user reporting the problem. Thus, helpdesk software may refer to software applications for tracking problems with hardware and software and their solutions.

FIG. 3 illustrates a block diagram of a network rendering system 300, which can be implemented in accordance with an embodiment. Note that in FIGS. 1-6 identical or similar blocks are generally indicated by identical reference numerals. Network rendering system 300 contains network 320, which is the medium used to provide communications links between various devices and computers connected together within network 320. Network 320 may include connections, such as, for example, wire, wireless communication links, fiber optic cables, and so forth. In the depicted example, print server 310 can be connected to network 320 along with storage unit 340. In addition, end-user workstations 350 and 355 connect to network 320. These end-user workstations 350 and 355 may be, for example, personal computers or network computers.

Data-processing system 100 depicted in FIG. 1 can be, for example, an end-user workstation such as end-user workstation 350 and 355. The end-user workstations 350 and 355 can be implemented as a helpdesk unit for operating a helpdesk which may be computerized and form part of the system 300 or alternatively may be external to the system and may comprise a human-operated help-desk. The helpdesk unit can be installed onsite i.e. in the customer environment. However, such helpdesk unit can also be offsite to provide the required functionality. Alternatively, data-processing system 100 can be implemented as a print server, such as print server 310, depending upon design considerations The printer server 310 can function as an operative communication medium between the user computer terminals 350 and 355 and the rendering devices 330, 332, 334, etc. Rendering devices 330, 332 and/or 334 can be distributed at various locations throughout a building, for example, or otherwise remotely located. While three rendering devices are shown by way of example, it is to be appreciated that any number of rendering devices may be linked to the network, such as two, four, six or more rendering devices. In general, the rendering devices 330, 332 and/or 334 can be utilized to perform a rendering output function (e.g., printing, scanning, copying, faxing, etc) within a networked environment. Note that the rendering device 108 described in greater detail herein is analogous or similar to rendering devices 330, 332 and/or 334. Similarly, computer terminals 350 and 355 are also generally similar to one another.

Note that as utilized herein, the term "rendering device" may refer to an apparatus or system such as a printer, scanner, fax machine, copy machine, etc., and/or a combination thereof. Preferably, rendering devices 330, 332 and/or 334 may function as a MFD (Multifunction Device) capable of multiple rendering functions such as printing, copying, scanning, faxing, etc. In some embodiments, rendering devices 330, 332 and 334 may be implemented with a single rendering function such as printing. In other embodiments, rendering devices 330, 332 and 334 can be configured to provide multiple rendering functions, such as scanning, faxing, printing and copying.

Note that an example of an MFD device, which may be utilized to implement rendering devices 330, 332, 334, etc., is disclosed in U.S. Pat. No. 7,525,676, entitled "System and method for controlling access to programming options of a multifunction device," which issued to Robert J. Pesar on Apr. 28, 2009. U.S. Pat. No. 7,525,676, which is assigned to the Xerox Corporation of Norwalk, Conn., and is incorporated herein by reference in its entirety. Another example of an MFD device, which may be utilized to implement rendering devices 330, 332, 334, and so forth, is disclosed in U.S. Pat. No. 7,474,428, which issued to Morris-Jones, et al on Jan. 6, 2009 and is entitled Multifunction device system using tags containing output information." U.S. Pat. No. 7,474,428 is also assigned to the Xerox Corporation of Norwalk, Conn., and is incorporated herein by reference in its entirety. An additional example of an MFD device and/or system, which may be utilized to implement rendering devices, 330, 332, 334, etc., is disclosed in U.S. Pat. No. 5,920,405, entitled "Multifunction device with printer/facsimile contention selection." U.S. Pat. No. 5,920,405, which issued to McIntyre, et al on Jul. 6, 1999 and is assigned to the Xerox Corporation of Norwalk, Conn., is also incorporated herein by reference in its entirety.

The printer server 310 is capable of receiving documents for rendering from the user computer terminals 350 and 355 and can select one or more destination network rendering devices 330, 332, 334 for routing the documents based on, for example, user preferences or other data. The computer terminals 350, 355, etc., can be, for example, any computing device capable of being integrated within a network, such as a PDA, personal computer, cellular telephone, point-of-sale terminal, server, etc. The rendering device 330, 332 and/or 334 can be located remotely with respect to each other, or alternatively, may be located locally with respect to each other, such as, for example, within a print shop or an office environment. The printer server 310 can automatically select the destination rendering devices 330, 332 and/or 334 for routing the rendering job requests.

In the depicted example, print server 310 provides data, such as boot files, operating system images, and applications to end-user workstations 350 and 355. End-user workstations 350 and 355 are clients to print server 310 in this example. Network rendering system 300 may include additional servers, end-user workstations, and other devices not shown. Specifically, end-user workstations may connect to any member of a network of servers, which provide equivalent content. FIG. 3 is intended as an example, and not as an architectural limitation of the disclosed embodiments.

The following description is presented with respect to embodiments of the present invention, which may be embodied in the context of a data-processing system, such as, for example, the data-processing system 100, the network rendering system 300 and the network 320 depicted respectively in FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
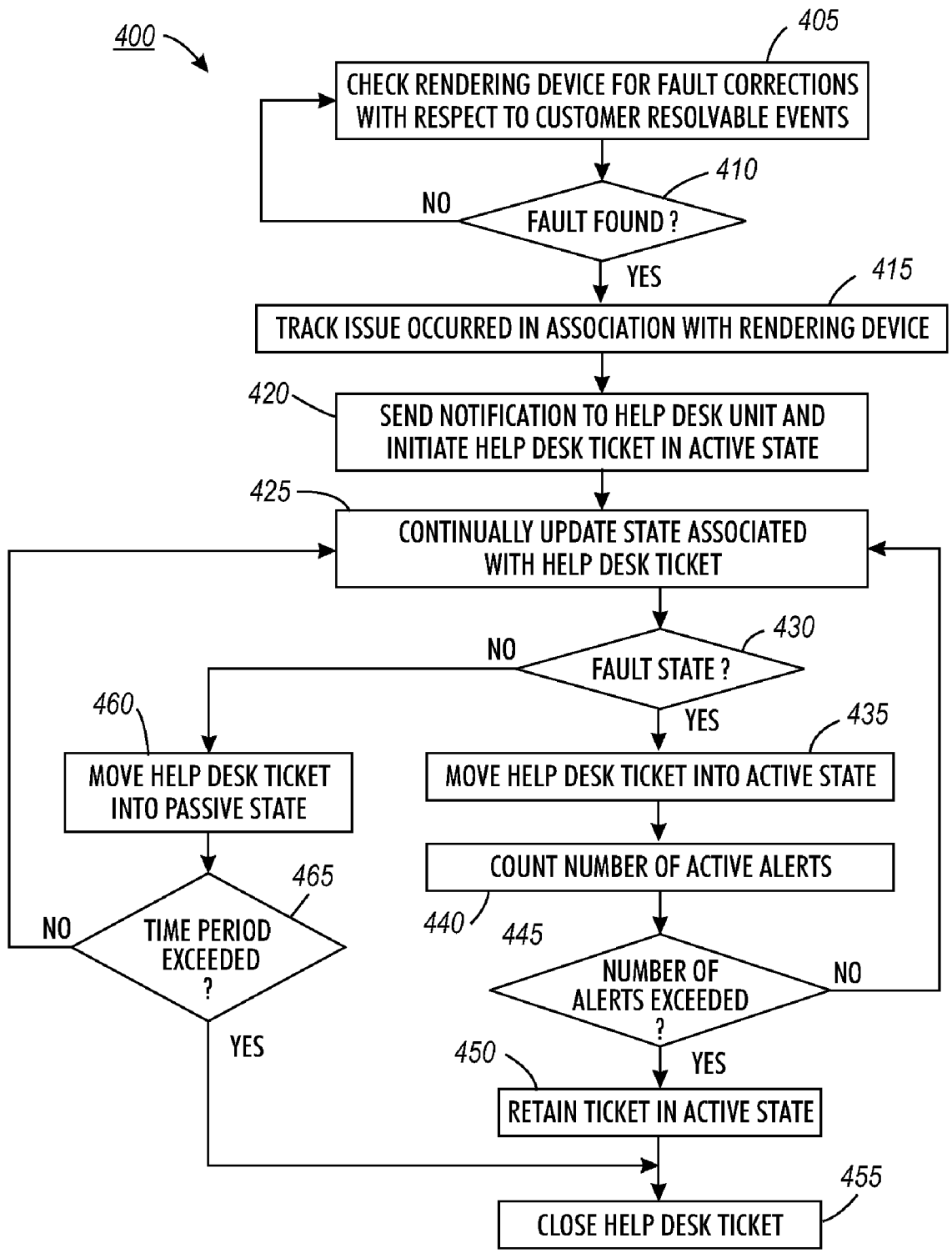
FIG. 4 illustrates a detailed flow chart of operations illustrating logical operational steps of a method for automatically generating a helpdesk ticket when a rendering device possesses a series of customer resolvable events within a time period, in accordance with an embodiment.

FIG. 4 illustrates a detailed flow chart of operations illustrating logical operational steps of a method 400 for automatically generating the helpdesk ticket when a remote rendering device 108 possesses a series of customer resolvable events within a short period of time, in accordance with an embodiment. Again as reminder, in FIGS. 1-6 identical or similar elements and components are generally indicated by identical reference numerals. The rendering device 108 can be checked for a fault condition with respect to the customer resolvable events such as, for example, paper jams and out of consumables, as illustrated at block 405. The device management module 152 continually checks the rendering device 108 for the fault condition and reports any issues associated with the rendering device 108 to the helpdesk unit 350.

A determination can be made whether the fault is found, as depicted at block 410. If the fault is found the issue occurred in association with the rendering device 108 can be tracked, as shown at block 415. Otherwise, the process can be continued from block 405. The device management module 152 can keep track of a previous error state and can reset a timer if the same error condition is detected within the specified time period. Next, as illustrated at block 420, a notification can be sent to the helpdesk unit 350 and the helpdesk ticket can be initiated in an active state. The state associated with the helpdesk ticket can be continually updated, as depicted at block 425.

Thereafter, as illustrated at block 430, a determination can be made whether the rendering device 108 is still in the fault state. If the rendering device 108 is in fault state the helpdesk ticket can be moved into the active state, as illustrated at block 435. The number of active alerts can then be counted, as depicted at block 440. A further determination can be made whether the number of alerts is exceeded, as indicated at block 445. If the number of alerts are exceeded the ticket can be maintained in the active state, as illustrated at block 450. Thereafter, the helpdesk ticket can be closed, as depicted at block 455. Otherwise, the process can be continued from block 425. If the fault state does not occur the helpdesk ticket can be moved into a passive state, as shown at block 460. Another determination can be made whether the time period exceeds the predefined time period, as illustrated at block 465. If the time period exceeds, the helpdesk ticket can be closed, as depicted at block 455. Otherwise the process can be continued from block 425.

Figure 5:
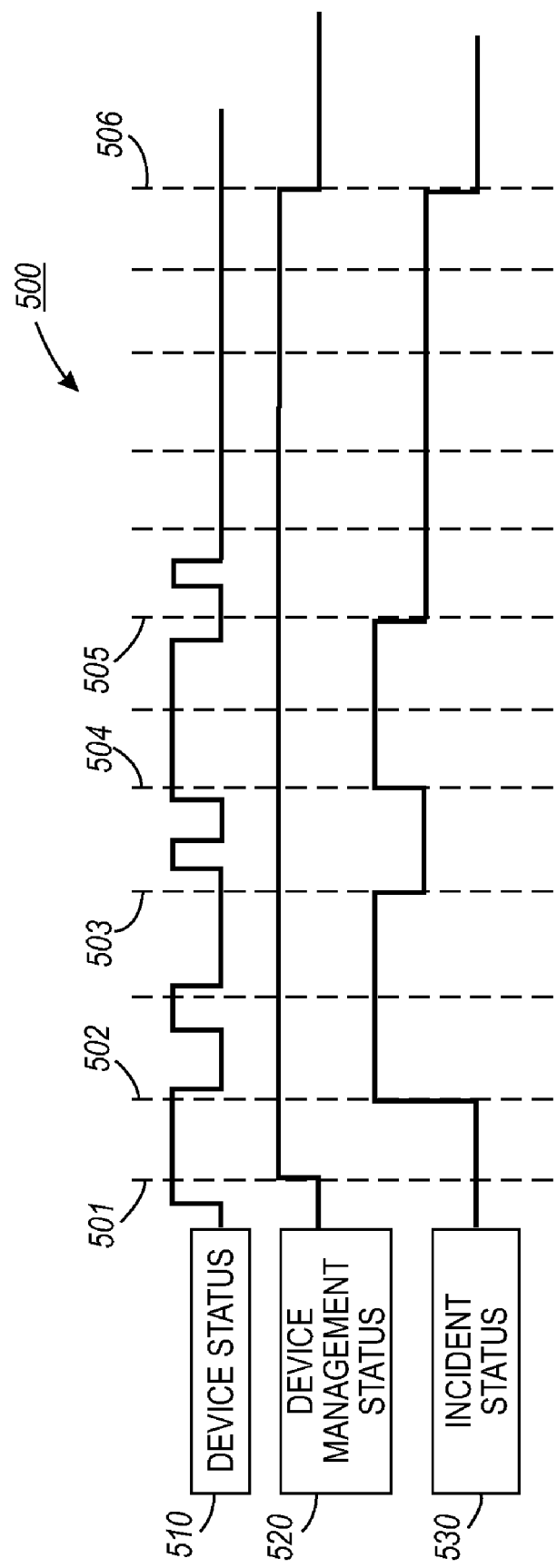
FIG. 5 illustrates a timing diagram depicting change of an incident status with respect to a device status, in accordance with an embodiment.

FIG. 5 illustrates a timing diagram 500 depicting auto change of an incident status 530 with respect to a device status 510, in accordance with an embodiment. The timing diagram 500 illustrates working of the helpdesk unit 350 when the rendering device 108 does not move into the fault state for the defined number of times before a time period is reached. The timing diagram 500 depicts the interpretation of the operational status of the rendering device 108 via the use of a number of status polls 501-506. The status polls 501-506 indicate a particular instance at which the device status 510, a device management status 520, and the incident status 530 can be determined.

The device management module 152 detects a problem in association with the rendering device 108 and starts tracking an issue with the rendering device 108, as shown at status poll 501. The device management module 152 checks the rendering device 108 to determine if the rendering device 108 is still in the fault state after a set period of time, as illustrated at status poll 502. As the rendering device 108 is still in the same fault state the device management module 152 sends a notification to the centralized helpdesk unit 350 and the helpdesk ticket can be created in the active state. Thereafter, as indicated at status poll 503, the rendering device 108 is no longer in the fault state and the helpdesk unit 350 moves the ticket into the passive state after sending notification to the helpdesk unit 350.

Next, the device management module 152 detects that the rendering device 108 is back in the fault state at status poll 504 and the helpdesk unit 350 moves the ticket back into the active state after sending notification to the helpdesk unit 350. Again, after a number of status polls that is at status poll 505 the rendering device 108 is no longer in the fault state and the helpdesk unit 350 moves the ticket into the passive state after sending notification to the helpdesk unit 350. Thereafter, at status poll 506, the device management module 152 identifies that the device 108 has been out of the fault state for the defined period of time and the ticket can be deleted. The deletion can be notified to the helpdesk unit 350 and the ticket can be closed.

Figure 6:
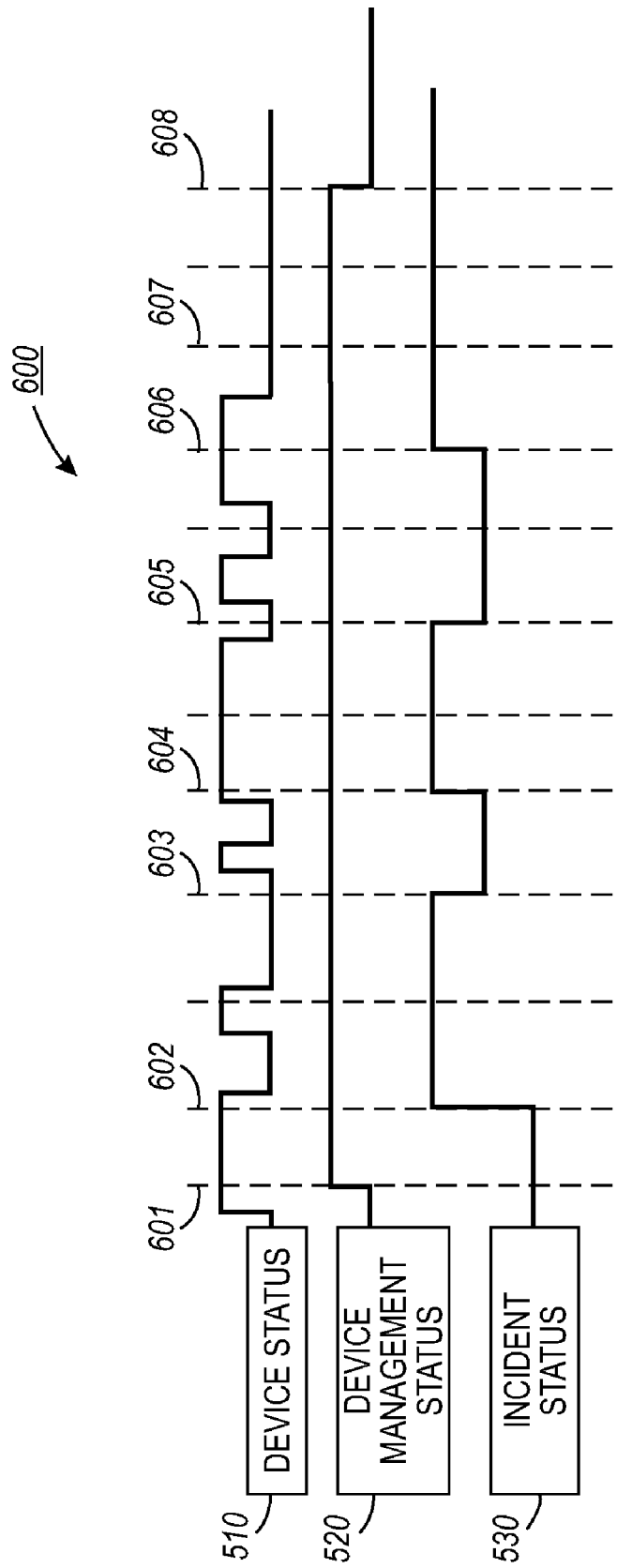
FIG. 6 illustrates a timing diagram depicting change of an incident status with respect to a device status, in accordance with an embodiment.

FIG. 6 illustrates a timing diagram 600 depicting the auto change of the incident status 530 with respect to the device status 510, in accordance with an embodiment. The timing diagram 600 illustrates working of the helpdesk unit 350 when the rendering device 108 moves into the fault state for the defined number of times before the time period is reached. Initially, at status poll 601, the device management module 152 detects that there is a problem with the rendering device 108 and starts tracking an issue with the rendering device 108. The device management module 152 checks the rendering device 108 to determine if the rendering device 108 is still in the fault state after a set period of time, as illustrated at status poll 602. As the rendering device 108 is still in the same fault state the device management module 152 sends a notification to the centralized helpdesk unit 350 and the helpdesk ticket can be created in the active state. The rendering device 108 is no longer in the fault state, as indicated at status poll 603, and the helpdesk unit 350 moves the ticket into the passive state after sending notification to the helpdesk unit 350.

Next, the device management module 152 detects that the rendering device 108 back in the fault condition at status poll 604 and the helpdesk unit 350 moves the ticket back into the active state after sending notification to the helpdesk unit 350. Again, after a number of status polls that is at status poll 605 the rendering device 108 is no longer in the fault state and the helpdesk unit 350 moves the ticket into the passive state after sending notification to the helpdesk unit 350. Thereafter, at status poll 606, the device management module 152 detects that the rendering device 108 is back in the fault condition and when the helpdesk unit 350 is notified it moves the ticket back into the active state.

Thereafter, at the status poll 607 the device management module 152 detects that the rendering device 108 is no longer in the fault state and when the helpdesk unit 350 is notified it does not move the ticket into the passive state because the number of times the alert has occurred has been reached. Note that the defined number of alerts in this exemplary timing diagram 600 is three. After the device 108 has been out of the fault state for a defined period of time at status poll 608, the device management module 152 clears the knowledge associated with the issue and notifies the helpdesk unit 350 but the ticket remains in the active state.

The customer resolvable issues can be tracked and notified to the helpdesk unit 350 without overwhelming the helpdesk unit 350 with the "no value add" incidents, which in turn reduces the cost of processing such low priority incidents. The centralized helpdesk unit 350 does not lose any information from the rendering device 108 as the incident can be updated each time the rendering device 108 changes the state. The occurrence of fault can be treated for assuring continued operation of the rendering device 108 with minimum disruption and notice of such fault occurrence can guide maintenance activity for providing uninterrupted device operation. Such a method and system enhance the performance of the rendering device 105 and extend the life expectancy.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
   automatically generating a helpdesk ticket when a fault condition with respect to a plurality of customer resolvable events associated with a rendering device occurs within a predefined time period;
   updating an incident state associated with said helpdesk ticket in accordance with an update from a device management module wherein said device management module generates a notification indicative with respect to each change of said incident state associated with said rendering device; and
   deleting said helpdesk ticket if said fault condition does not reoccur within said predefined time period in order to remotely maintain and manage said rendering device.

2. The method of claim 1 wherein updating said incident state associated with said helpdesk ticket further comprises:

automatically placing said helpdesk ticket into an active state, in response to triggering of an alert with respect to said fault condition associated with said plurality of customer resolvable events.

3. The method of claim 2 wherein updating said incident state associated with said helpdesk ticket further comprises:
automatically placing said helpdesk ticket into a passive state when said alert with respect to said fault condition is no longer triggered for said predefined time period.

4. The method of claim 2 wherein updating said incident state associated with said helpdesk ticket further comprises:
maintaining said helpdesk ticket in said active state, if said fault condition is detectable for a predefined number of instances without leaving said incident state during said predefined time period.

5. The method of claim 2 further comprising switching said helpdesk ticket to said active state if said fault condition reoccurs within said predefined time period.

6. The method of claim 1 further comprising monitoring said plurality of customer resolvable events associated with said rendering device in order to thereby initiate said helpdesk ticket when said plurality of customer resolvable events persists for said predefined time period.

7. The method of claim 1 further comprising resetting said predefined time period between said alert if said plurality of customer resolvable events happens infrequently in order to thereby automatically close said helpdesk ticket.

8. A system, comprising:
a processor;
a data bus coupled to said processor; and
a computer-usable medium embodying computer code, said computer-usable medium being coupled to said data bus, said computer program code comprising instructions executable by said processor and configured for
automatically generating a helpdesk ticket when a fault condition with respect to a plurality of customer resolvable events associated with a rendering device occurs within a predefined time period;
updating an incident state associated with said helpdesk ticket in accordance with an update from a device management module wherein said device management module generates a notification indicative with respect to each change of said incident state associated with said rendering device; and
deleting said helpdesk ticket if said fault condition does not reoccur within said predefined time period in order to remotely maintain and manage said rendering device.

9. The system of claim 8 wherein said instructions for updating said incident state associated with said helpdesk ticket are further configured for automatically placing said helpdesk ticket into an active state, in response to triggering of an alert with respect to said fault condition associated with said plurality of customer resolvable events.

10. The system of claim 9 wherein said instructions for updating said incident state associated with said helpdesk ticket are further configured for automatically placing said helpdesk ticket into a passive state when said alert with respect to said fault condition is no longer triggered for said predefined time period.

11. The system of claim 9 wherein said instructions for updating said incident state associated with said helpdesk ticket are further configured for maintaining said helpdesk ticket in said active state, if said fault condition is detectable for a predefined number of instances without leaving said incident state during said predefined time period.

12. The system of claim 9 wherein said instructions are further configured for switching said helpdesk ticket to said active state if said fault condition reoccurs within said predefined time period.

13. The system of claim 8 wherein said instructions are further configured for monitoring said plurality of customer resolvable events associated with said rendering device in order to thereby initiate said helpdesk ticket when said plurality of customer resolvable events persists for said predefined time period.

14. The system of claim 8 wherein said instructions are further configured for resetting said predefined time period between said alert if said plurality of customer resolvable events happens infrequently in order to thereby automatically close said helpdesk ticket.

15. A non-transitory computer-usable medium embodying computer program code, said computer program code comprising computer executable instructions configured for:
automatically generating a helpdesk ticket when a fault condition with respect to a plurality of customer resolvable events associated with a rendering device occurs within a predefined time period;
updating an incident state associated with said helpdesk ticket in accordance with an update from a device management module wherein said device management module generates a notification indicative with respect to each change of said incident state associated with said rendering device; and
deleting said helpdesk ticket if said fault condition does not reoccur within said predefined time period in order to remotely maintain and manage said rendering device.

16. The non-transitory computer-usable medium of claim 15 wherein said embodied computer program code further comprises computer executable instructions configured for automatically placing said helpdesk ticket into an active state, in response to triggering of an alert with respect to said fault condition associated with said plurality of customer resolvable events.

17. The non-transitory computer-usable medium of claim 16 wherein said embodied computer program code further comprises computer executable instructions configured for automatically placing said helpdesk ticket into a passive state when said alert with respect to said fault condition is no longer triggered for said predefined time period.

18. The non-transitory computer-usable medium of claim 16 wherein said embodied computer program code further comprises computer executable instructions configured for maintaining said helpdesk ticket in said active state, if said fault condition is detectable for a predefined number of instances without leaving said incident state during said predefined time period.

* * * * *